United States Patent
Hwang

(10) Patent No.: US 12,525,004 B2
(45) Date of Patent: Jan. 13, 2026

(54) METHOD AND APPARATUS FOR IMPROVING QUALITY AND REALISM OF RENDERED IMAGE

(71) Applicant: ELECTRONICS AND TELECOMMUNICATIONS RESEARCH INSTITUTE, Daejeon (KR)

(72) Inventor: Bon-Woo Hwang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 388 days.

(21) Appl. No.: 17/942,685

(22) Filed: Sep. 12, 2022

(65) Prior Publication Data

US 2023/0196536 A1  Jun. 22, 2023

(30) Foreign Application Priority Data

Dec. 20, 2021 (KR) .................. 10-2021-0182514

(51) Int. Cl.
*G06V 10/82* (2022.01)
*G06T 5/60* (2024.01)
*G06T 7/00* (2017.01)
*G06V 10/774* (2022.01)
*G06V 10/98* (2022.01)

(52) U.S. Cl.
CPC ............. *G06V 10/82* (2022.01); *G06T 5/60* (2024.01); *G06T 7/0002* (2013.01); *G06V 10/774* (2022.01); *G06V 10/993* (2022.01); *G06T 2207/20081* (2013.01); *G06T 2207/30168* (2013.01)

(58) Field of Classification Search
None
See application file for complete search history.

(56) References Cited

U.S. PATENT DOCUMENTS 8,958,642 B2  2/2015  Cho et al.
10,346,977 B2  7/2019  Chae et al.
(Continued)

FOREIGN PATENT DOCUMENTS

KR  10-2019-0074911  6/2019
KR  10-2020-0084434  7/2020
(Continued)

OTHER PUBLICATIONS

LookinGood: Enhancing Performance Capture with Real-Time Neural Re-Rendering. Martin-Brualla et al. (Year: 2018).*
(Continued)

*Primary Examiner* — Delomia L Gilliard
(74) *Attorney, Agent, or Firm* — KILE PARK REED & HOUTTEMAN PLLC

(57) ABSTRACT

Disclosed herein is a method for improving the quality and realism of a rendered image. The method includes receiving training data including a real image and a rendered image, generating a low-quality image using the training data, generating a high-quality image using the low-quality image, generating a realistic image using the high-quality image, and training a neural network using an error calculated based on the high-quality image and the realistic image.

14 Claims, 11 Drawing Sheets

(56) References Cited

U.S. PATENT DOCUMENTS

| | | | |
|---|---|---|---|
| 10,896,535 | B2* | 1/2021 | Li .................... G06T 13/40 |
| 2019/0295223 | A1* | 9/2019 | Shen .................. G06T 5/60 |
| 2020/0134383 | A1* | 4/2020 | Rhee ................. G06N 3/088 |
| 2021/0144357 | A1* | 5/2021 | Kim ................. H04N 13/271 |
| 2021/0209388 | A1* | 7/2021 | Ciftci ............... G06N 3/045 |
| 2021/0264568 | A1* | 8/2021 | Shi .................. G06T 3/4053 |
| 2023/0196536 | A1* | 6/2023 | Hwang ............... G06V 10/82 382/112 |

FOREIGN PATENT DOCUMENTS

| | | |
|---|---|---|
| KR | 10-2020-0109014 | 9/2020 |
| KR | 10-2021-0056149 | 5/2021 |
| KR | 10-2021-0056619 | 5/2021 |
| KR | 10-2021-0085403 | 7/2021 |
| KR | 10-2279772 | 7/2021 |
| KR | 10-2021-0128605 | 10/2021 |

OTHER PUBLICATIONS

Training Generative Adversarial Networks with Limited Data to Karras et al. (Year: 2020).*

Tero Karras et al., "Analyzing and Improving the Image Quality of StyleGAN", Proceedings of the IEEE/CVF Conference on Computer Vision and Pattern Recognition (CVPR), Jun. 14, 2020, pp. 1-21.

Olaf Ronneberger et al., "U-Net: Convolutional Networks for Biomedical Image Segmentation", Medical Image Computing and Computer-Assisted Intervention—MICCAI 2015, Nov. 18, 2015, pp. 1-8.

Xintao Wang et al., "Towards Real-World Blind Face Restoration with Generative Facial Prior", Proceedings of the IEEE/CVF Conference on Computer Vision and Pattern Recognition (CVPR), Jun. 11, 2021, 11 total pages.

Stephan R. Richter et al., "Enhancing photorealism enhancement", arXiv:2105.04619, May 10, 2021, pp. 1-16.

Baek et al. "Generation of Virtual Viewpoint Images from Video and Images," Broadcasting and Media Magazine, Oct. 30, 2021, pp. 1-14.

* cited by examiner

METHOD AND APPARATUS FOR IMPROVING QUALITY AND REALISM OF RENDERED IMAGE

CROSS REFERENCE TO RELATED APPLICATION

This application claims the benefit of Korean Patent Application No. 10-2021-0182514, filed Dec. 20, 2021, which is hereby incorporated by reference in its entirety into this application.

BACKGROUND OF THE INVENTION

1. Technical Field

The present invention relates generally to technology capable of improving the quality and realism of an image acquired by rendering a 3D object using computer graphics.

More particularly, the present invention relates to technology for performing training in order to improve the quality and realism of a rendered image using real images and rendered images.

2. Description of the Related Art

Recently, the demand for 3D content has rapidly increased with an increasing number of games and animations using 3D graphics and virtual-reality and augmented-reality applications. Particularly, the necessity for technology capable of generating photorealistic 3D content images that can be played in real time on a state-of-the-art high-resolution display is increasing.

In a conventional method of generating a photorealistic high-quality rendered image, a photorealistic high-quality rendered image is generated by manually creating a high-quality 3D object form and a texture model at high cost and simulating light rays and the laws of physics by performing a lot of computational operations using high-speed 3D graphics rendering hardware and software. However, this method consumes a lot of expense and time for a 3D object model and requires expensive 3D graphics rendering hardware. Also, in spite of advancements in computer graphics technology over the past few decades, the realism of an image acquired by rendering a human body in real time has a limitation that cannot overcome the so-called "uncanny valley".

In order to overcome these disadvantages, research for improving the quality of a rendered image using deep neural-network technology or improving the realism of car-racing game images has recently been conducted. However, technology for improving the quality of an image and technology for improving realism have been individually researched based on different applications in order to accomplish different purposes, that is, a purpose of quality improvement, such as restoration of damaged images, increase in resolution, removal of noise, and the like, and a purpose of improvement in the realism of a 3D graphics rendered image.

Accordingly, for quality improvement, images that are photorealistic but have low quality due to low resolution, image noise, color distortion, and the like are used as input, rather than non-photorealistic rendered images. Also, when it is intended to make a 3D graphics rendered image realistic, the realism of the resultant image may be improved, but lowered resolution, increased image noise, or a blurred image can result because the purpose is only improvement in realism. Also, when training data required for application of deep neural-network technology for improving the quality and realism of images is collected, it is relatively easy to collect a large number of high-quality real images thanks to the proliferation of digital cameras and smartphones including high-resolution cameras, but it is very difficult to collect a large number of 3D graphics rendered images for various 3D objects and scenes produced for content services, such as games, animations, digital agent services, and the like.

DOCUMENTS OF RELATED ART (Patent Document 1) Korean Patent Application Publication No. 10-2020-0109014, titled "Method and apparatus for real-time reconstruction of 360-degree image based on polygon"

(Patent Document 2) Korean Patent Application Publication No. 10-2019-0074911, titled "Method for providing realistic image content and server using the same".

SUMMARY OF THE INVENTION

An object of the present invention is to train a neural network for generating a high-quality rendered image using rendered images having low quality and poor photorealism.

Another object of the present invention is to generate an image providing realism and high quality with a small amount of calculation by using a 3D object model created at low cost in a short time.

In order to accomplish the above objects, a method for improving quality and realism of a rendered image according to an embodiment of the present invention includes receiving training data including a real image and a rendered image, generating a low-quality image using the training data, generating a high-quality image using the low-quality image, generating a realistic image using the high-quality image, and training a neural network using an error calculated based on the high-quality image and the realistic image.

Here, the error calculated based on the high-quality image and the realistic image may include a quality restoration error between the generated high-quality image and training data transformed to correspond to the high-quality image.

Here, the error calculated based on the high-quality image and the realistic image may include an adversarial generation error calculated using a generative adversarial network structure, which uses a neural network for generating the realistic image as a generator.

Here, the generative adversarial network structure may use a real image as a ground truth when an image input thereto is a low-quality image generated based on the real image, and may use an arbitrary real image in the training data as a ground truth when the image input thereto is a low-quality image generated based on a rendered image, because a real image corresponding thereto is not present.

Here, the error calculated based on the high-quality image and the realistic image may include a pixel restoration error between the training data and the realistic image and a perceptual restoration error calculated based on respective feature vectors of the training data and the realistic image.

Here, the pixel restoration error may be calculated based on a first distance equation when the training data is a real image, and may be calculated based on a second distance equation, which differs from the first distance equation, when the training data is a rendered image.

Here, the error calculated based on the high-quality image and the realistic image may include an identity preservation error between the low-quality image and the realistic image, which is calculated using a pretrained identification neural network.

Also, in order to accomplish the above objects, an apparatus for improving quality and realism of a rendered image according to an embodiment of the present invention includes a low-quality image generation unit for generating a low-quality image using training data, including a real image and a rendered image, an image restoration unit for generating a high-quality image using the low-quality image, a realistic-image generation unit for generating a realistic image using the high-quality image, and an error analysis unit for training a neural network using an error calculated based on the high-quality image and the realistic image.

Here, the error analysis unit may include a quality error analysis unit for calculating a quality restoration error between the generated high-quality image and training data transformed to correspond to the high-quality image.

Here, the error analysis unit may include an adversarial generation error analysis unit for calculating an adversarial generation error using a generative adversarial network structure, which uses a neural network for generating the realistic image as a generator.

Here, the generative adversarial network structure may use a real image as a ground truth when an image input thereto is a low-quality image generated based on the real image, and may use an arbitrary real image in the training data as a ground truth when the image input thereto is a low-quality image generated based on a rendered image, because a real image corresponding thereto is not present.

Here, the error analysis unit may include a realistic-image error analysis unit for calculating a pixel restoration error between the training data and the realistic image and calculating a perceptual restoration error based on respective feature vectors of the training data and the realistic image.

Here, the realistic-image error analysis unit may calculate the pixel restoration error based on a first distance equation when the training data is a real image, and may calculate the pixel restoration error based on a second distance equation, which differs from the first distance equation, when the training data is a rendered image.

Here, the error analysis unit may include an identity error analysis unit for calculating an identity preservation error between the low-quality image and the realistic image using a pretrained identification neural network.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
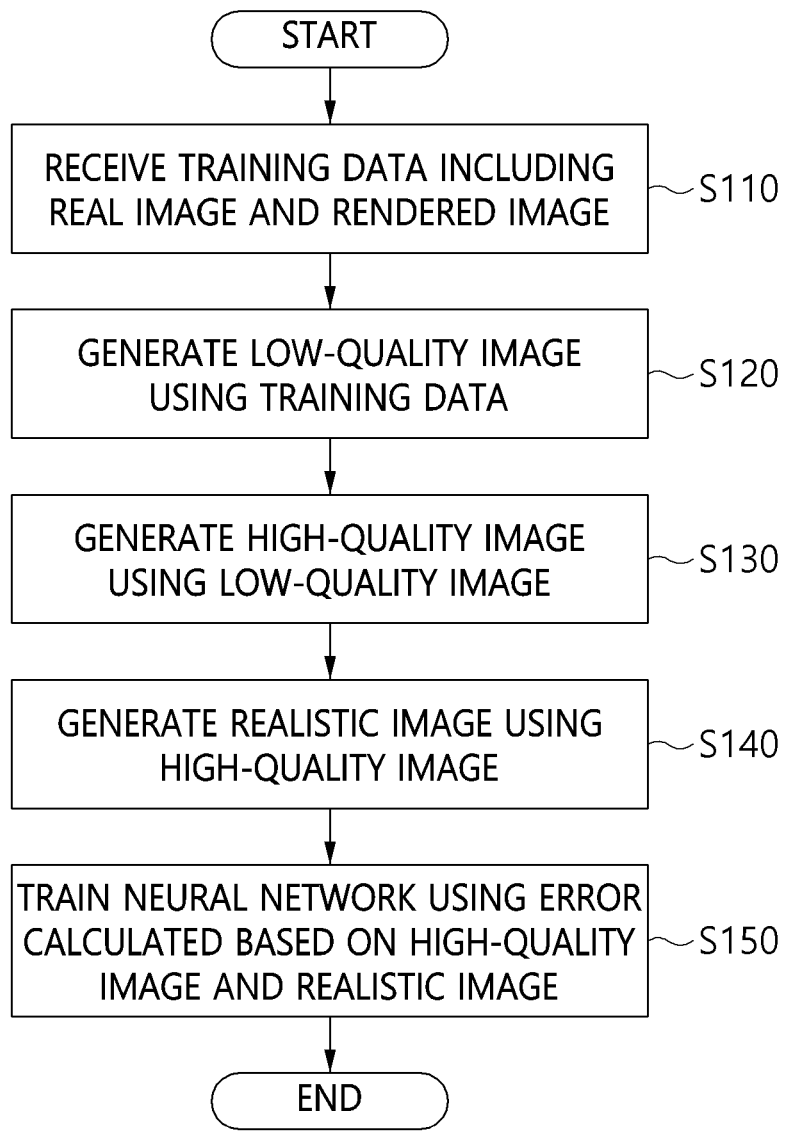
FIG. 1 is a flowchart illustrating a method for improving the quality and realism of a rendered image according to an embodiment of the present invention.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

FIG. 1 is a flowchart illustrating a method for improving the quality and realism of a rendered image according to an embodiment of the present invention.

The method for improving the quality and realism of a rendered image according to an embodiment of the present invention may be performed by an apparatus for improving the quality and realism of a rendered image, such as a computing device.

Referring to FIG. 1, in the method according to an embodiment, training data including real images and rendered images is received at step S110. Here, the training data may be data stored in advance in a training image database. Here, the training image database may contain a real-image dataset and a rendered-image dataset.

Subsequently, a low-quality image is generated using the training data at step S120. Here, generating a low-quality image at step S120 may comprise degrading the quality of an image by performing color distortion, addition of Gaussian noise, image compression, decrease in resolution, and the like on the training data.

Subsequently, a high-quality image is generated using the low-quality image at step S130. Here, generating a high-quality image at step S130 may be performed using an image quality restorer corresponding to a deep-learning neural-network structure or the like. Subsequently, a realistic image is generated using the high-quality image at step S140. Here, generating a realistic image at step S140 may be performed using a realistic-image generator corresponding to a deep-learning neural-network structure, or the like.

Subsequently, a neural network is trained using an error calculated based on the high-quality image and the realistic image at step S150.

Here, the error calculated based on the high-quality image and the realistic image may include a quality restoration error between the generated high-quality image and training data transformed to correspond to the high-quality image.

Here, the error calculated based on the high-quality image and the realistic image may include an adversarial generation error calculated using a generative adversarial network structure that uses the neural network for generating a realistic image as the generator thereof.

Here, the generative adversarial network structure may use a real image as a ground truth when the image input thereto is a low-quality image generated based on the real image, and may use an arbitrary real image in the training data as a ground truth when the image input thereto is a low-quality image generated based on a rendered image, because there is no real image corresponding to the input image.

Here, the error calculated based on the high-quality image and the realistic image may include a pixel restoration error between the training data and the realistic image and a perceptual restoration error, calculated based on the respective feature vectors of the training data and the realistic image.

Here, the pixel restoration error may be calculated based on a first distance equation when the training data is a real image, and may be calculated based on a second distance equation, which differs from the first distance equation, when the training data is a rendered image.

Here, the error calculated based on the high-quality image and the realistic image may include an identity preservation error between the low-quality image and the realistic image, which is calculated using a pretrained identification neural network.

Here, the steps for calculating the error may be performed in stages or in parallel, and the scope of the present invention is not limited with regard thereto.

Figure 2:
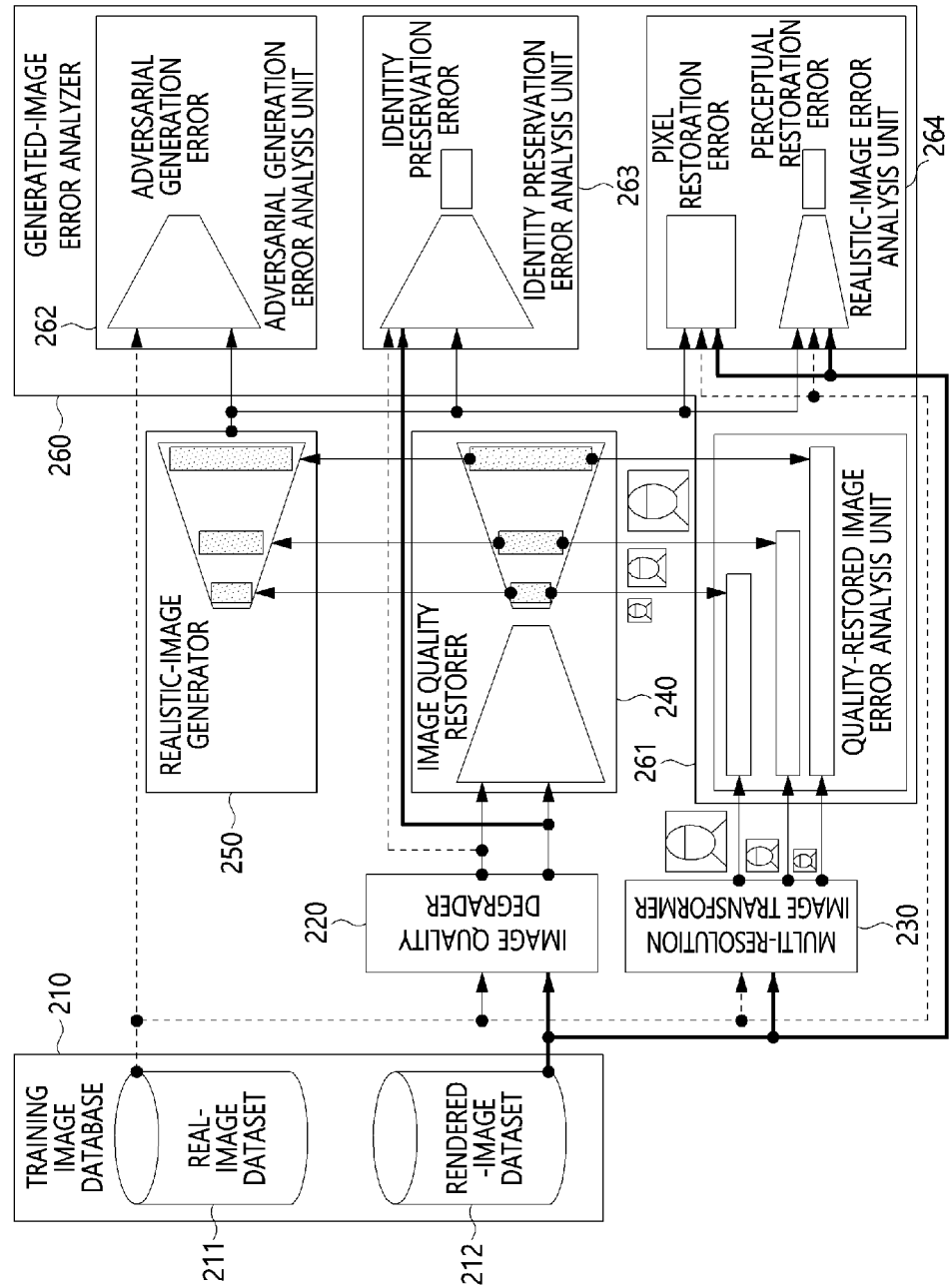
FIG. 2 is a block diagram illustrating in detail an apparatus for improving the quality and realism of a rendered image.
Figure 3:
FIGS. 3 to 8 are examples of a low-quality, non-photorealistic rendered image.
Figure 4:
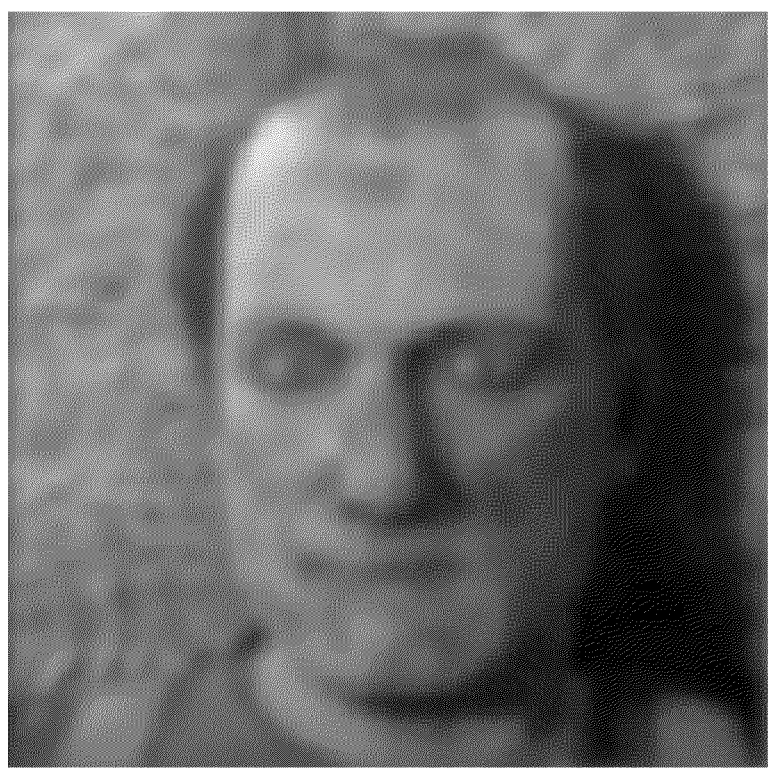
Figure 5:
Figure 6:
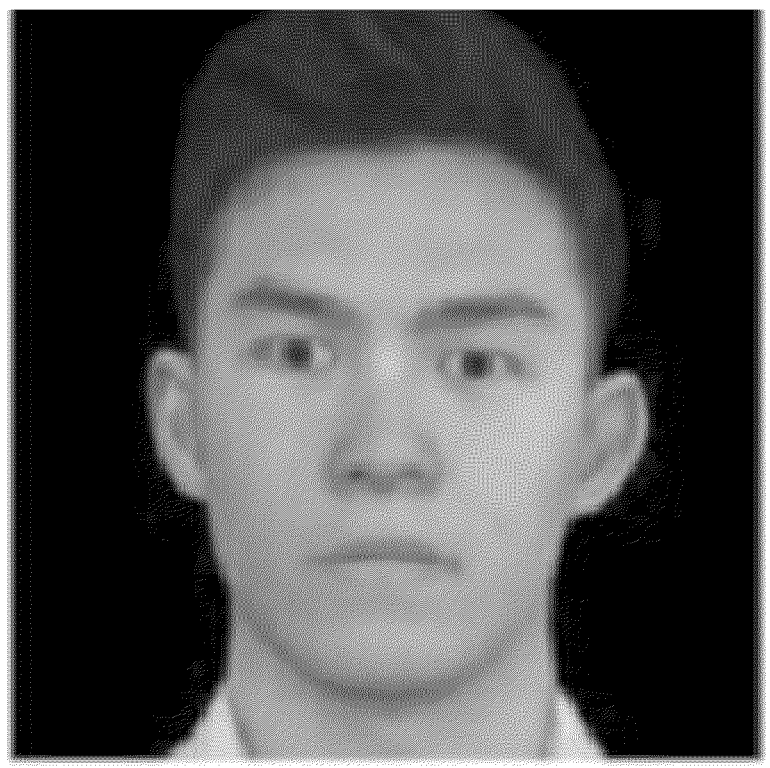

FIG. 2 is a block diagram illustrating in detail an apparatus for improving the quality and realism of a rendered image.

Referring to FIG. 2, the apparatus for improving the quality and realism of a rendered image according to an embodiment of the present invention includes a training image database 210, containing a real-image dataset 211 composing of high-quality real images and a rendered-image dataset 212 composing of images acquired by rendering 3D objects using a graphics card and rendering software, an image quality degrader 220 for generating a low-quality image to be used for image quality restoration, a multi-resolution image transformer 230 for converting a training image into multiple-resolution images, an image quality restorer 240 for generating a high-quality image from an image having degraded quality, a realistic-image generator 250 for generating a realistic image by transforming an image restored having high-quality into a realistic image, and a generated-image error analyzer 260 for analyzing a quality restoration error, an adversarial generation error, an identity preservation error, a pixel restoration error, a perceptual restoration error, and the like in order to restore image quality and generate a realistic image.

Here, the training image database 210 is configured by storing the real-image dataset 211, including high-quality real images, and the rendered-image dataset 212, including images acquired by rendering 3D objects using a graphics card and rendering software, in a storage device, such as a hard disk or the like. The stored real-image dataset 211 and the stored rendered-image dataset 212 are used as training data for restoring image quality and generating a realistic image.

Here, the image quality degrader 220 degrades the quality of images by performing image processing, such as color distortion, addition of Gaussian noise, image compression, decrease in resolution, and the like on the real images and rendered images stored in the training image database 210. The images, the quality of which is degraded by the image quality degrader 220, are used to train the deep neural network of the image quality restorer 240. Components used for quality degradation, such as color distortion, addition of Gaussian noise, image compression, decrease in resolution, and the like, the frequency of application of the components, and the degree of application of the components may be variously set, and the scope of the present invention is not limited thereto.

Here, the multi-resolution image transformer 230 generates images by reducing the width and the height of a training image, input from the training image database 210, to ½, ¼, ⅛, etc. of the original size thereof using an image interpolation method or the like.

Here, the image quality restorer 240 is formed of a deep-neural network for generating a high-quality image from the image having degraded quality, which is input from the image quality degrader 220, by training the neural network. The image quality restorer 240 may be formed of a U-Net, which is a model based on an end-to-end fully-convolutional network that is mainly used for image segmentation or the like. However, the scope of the present invention is not limited to the structure of the neural network of the image quality restorer, and the structure of the neural network may be replaced with another neural network structure having the same function as needed.

Here, the realistic-image generator 250 is formed of a deep neural network for generating a realistic image by receiving a multi-resolution image from a layer of the neural network of the image quality restorer 240. The realistic-image generator 250 may be formed of StyleGAN2, which is a neural network model used for generating a high-quality image or the like. However, the scope of the present invention is not limited with regard to the structure of the neural network of the realistic-image generator 250, and the structure of the neural network of the realistic-image generator 250 may be replaced with another neural network structure having the same function as needed.

Here, the generated-image error analyzer 260 includes a quality-restored image error analysis unit 261, an adversarial generation error analysis unit 262, an identity preservation error analysis unit 263, and a realistic-image error analysis unit 264 in order to restore image quality and generate a realistic image. The deep neural networks of the image quality restorer 240 and the realistic-image generator 250 are optimized by minimizing the errors analyzed by the generated-image error analyzer 260.

Here, the quality-restored image error analysis unit 261 calculates errors between multiple-resolution images, input from the multi-resolution image transformer 230, and restored multiple-resolution images, input from the image quality restorer 240, for each of the resolutions using distance equations, such as L1 norm or L2 norm, and calculates a quality restoration error using a weighted sum. Here, the multiple-resolution images input from the multi-resolution image transformer 230 are used as a ground truth.

Here, the adversarial generation error analysis unit 262 has a generative adversarial network structure, which uses the realistic-image generator 250 as a generator and includes a discriminator within the adversarial generation error analysis unit 262. An adversarial generation error is calculated by inputting the realistic image, generated by the realistic-image generator 250, to the discriminator in the adversarial generation error analysis unit 262. In order to train the discriminator in the adversarial generation error analysis unit 262, the discriminator is optimized by setting a real image acquired from the real-image dataset 211 in the training image database 210 as a true value and the image generated by the realistic-image generator 250 as a fake value.

Here, in the case of a real image, training is performed using paired data of a real image and a quality-degraded image corresponding thereto, which is acquired using the image quality degrader 220, as in the conventional image quality improvement method. However, in the case of a rendered image, a quality-degraded image to be used as a fake value can be acquired using the image quality degrader 220, but a high-quality real image corresponding thereto is not present. Accordingly, unpaired data in which an arbitrary real image acquired from the real-image dataset 211 in the training image database 210 is used as a ground truth may be used.

Here, the identity preservation error analysis unit 263 calculates an error between a quality-degraded image, acquired from the image quality degrader 220, and a realistic image, acquired from the realistic-image generator 250, using a pretrained identification neural network. The identity preservation error analysis unit 263 is not an essential component of the present invention, and may be optionally used.

Here, the realistic-image error analysis unit 264 receives a real image and a rendered image from the training image database 210, receives a realistic image generated by the realistic-image generator 250, calculates an error using a distance equation applied in units of pixels, and calculates an average, thereby calculating a pixel restoration error. Also, feature vectors for the real image and the rendered image, acquired from the training image database 210, and a feature vector for the realistic image, generated by the realistic-image generator, are acquired by using a pretrained object recognition neural network as a feature extractor, errors are calculated using a distance equation for the feature vectors, and an average thereof is calculated, whereby a perceptual restoration error is calculated.

Here, in the case of a real image, the real image itself is a ground truth, and a distance equation, such as a general L1 norm equation or the like, may be used as a distance function. The L1 norm equation is as shown in Equation (1) below. In the case of a rendered image, because the rendered image acquired from the training image database is the target to be made realistic, not the general L1 norm equation but a smooth L1 distance function, in which a distance value is proportional to L1 norm when the absolute value of a pixel-wise difference is greater than a preset reference ($\beta$, and is proportional to L2 norm when the absolute value of the pixel-wise difference is less than the reference, is used. The smooth L1 distance function is as shown in Equation (2) below. Unlike a real image, a rendered image is not a ground truth but a target that has to be made realistic. Accordingly, when the absolute value of a pixel-wise difference is greater than the reference, a distance value proportional to a general L1 norm is used, whereas when the absolute value of the pixel-wise difference is less than the reference, a distance value proportional to a L2 norm, which tends to minimize the distance value, is used. That is, a strategy for increasing the relative influence of the adversarial generation error may be advantageous to realistic visualization.

$$d(x, y) = \{d_1, \ldots, d_N\}^T, \quad (1)$$
$$d_n = |x_n - y_n|$$
$$d(x, y) = \{d_1, \ldots, d_N\}^T, \quad (2)$$
$$d_n = \begin{cases} 0.5(x_n - y_n)^2/\beta, & \text{if } |x_n - y_n| < \beta \\ |x_n - y_n| - 0.5^*\beta, & \text{otherwise} \end{cases}$$

FIGS. 3 to 8 are examples of a low-quality, non-photorealistic rendered image.

FIGS. 9 to 14 are examples of an image having improved quality and realism generated by applying the method according to an embodiment of the present invention.

Figure 7:
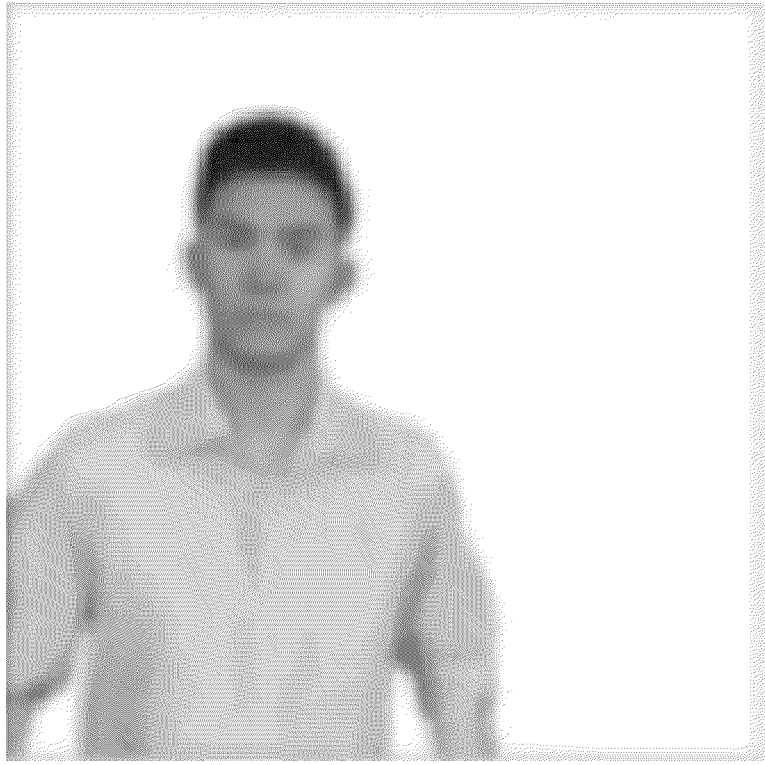
Figure 8:
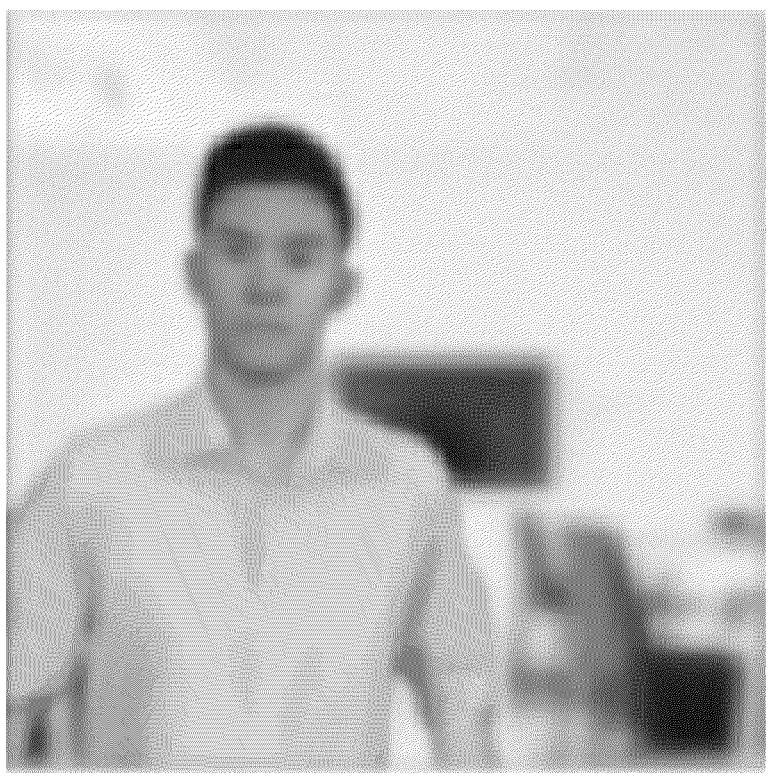
Figure 9:
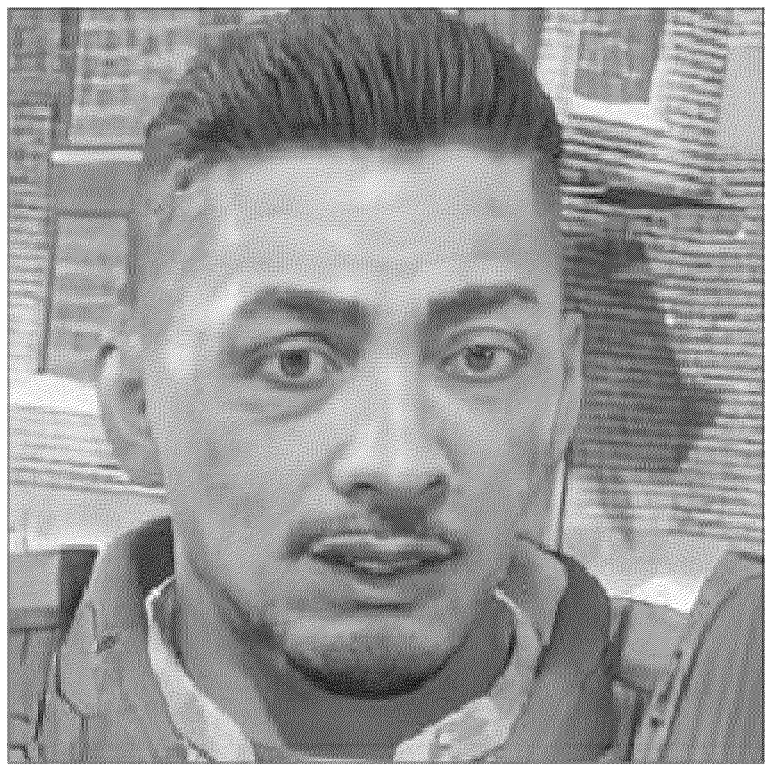
FIGS. 9 to 14 are examples of an image having improved quality and realism that is generated by applying a method according to an embodiment of the present invention.
Figure 10:
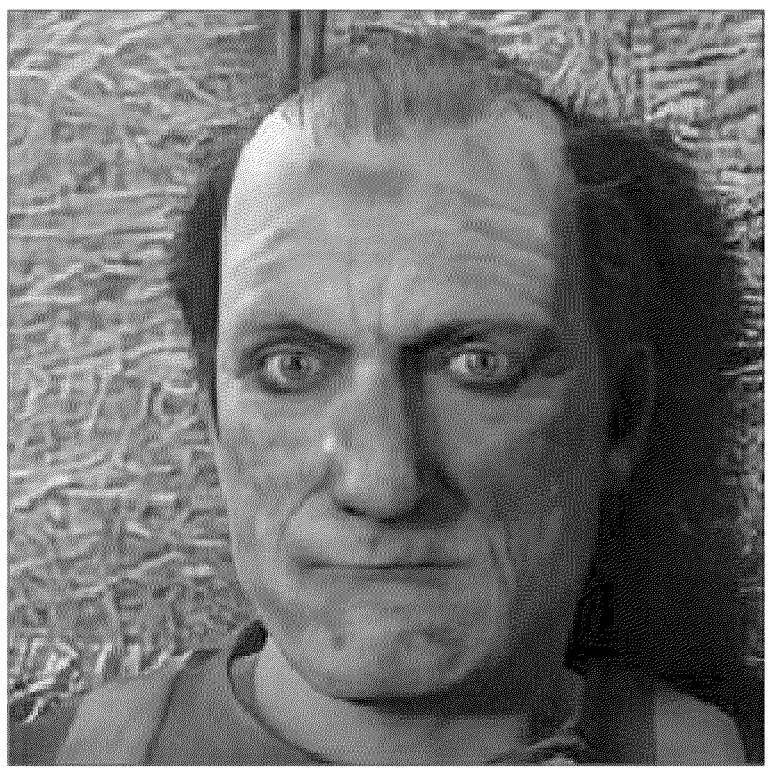
Figure 11:
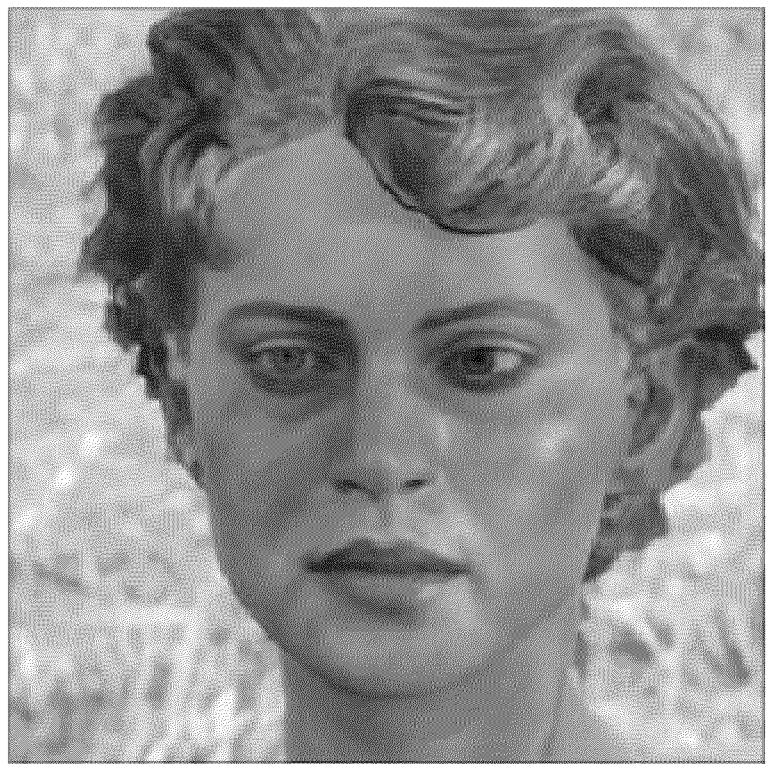
Figure 12:
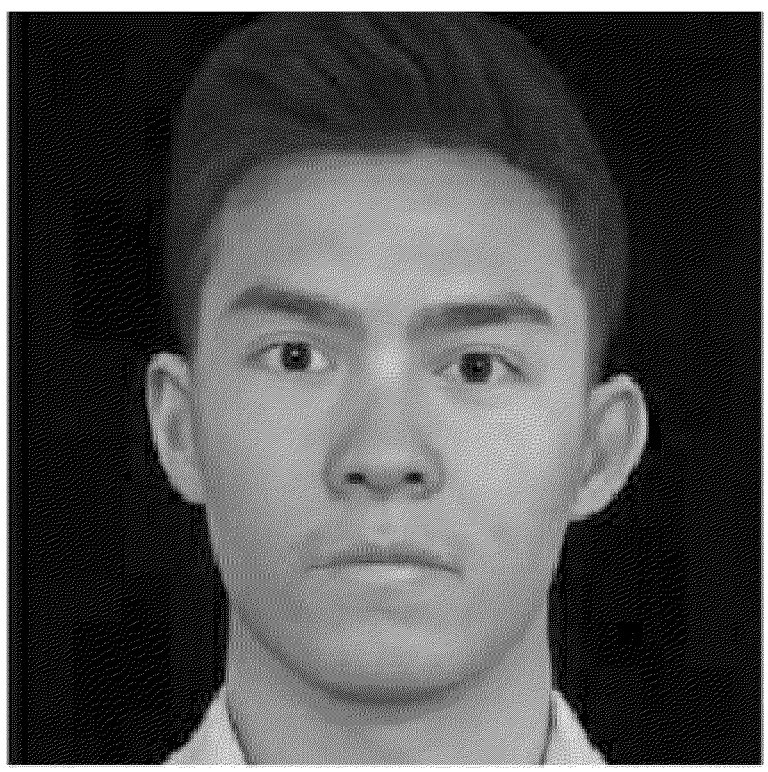
Figure 13:
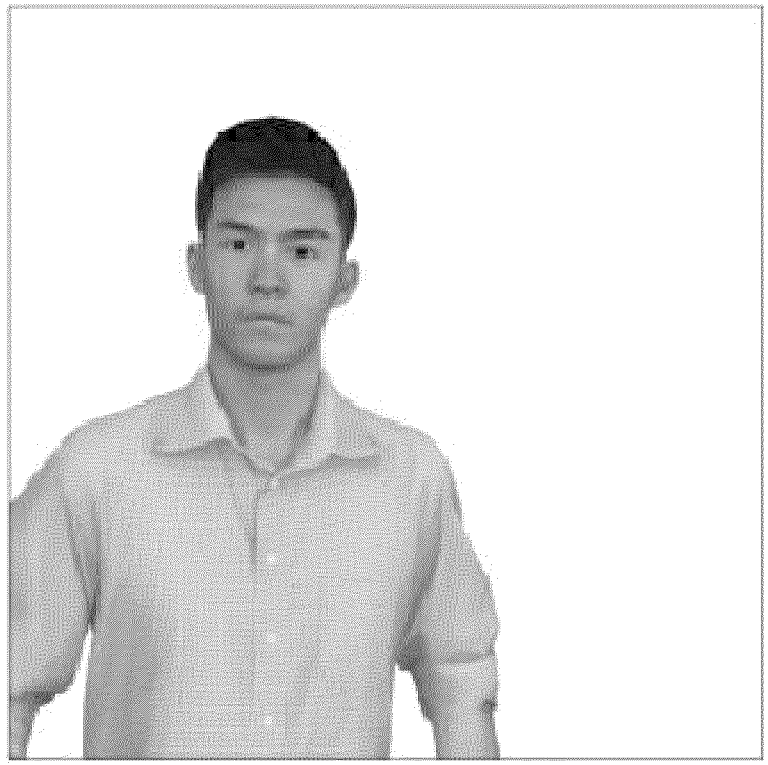
Figure 14:

That is, the method and apparatus according to an embodiment of the present invention may output the images of FIGS. 9 to 14 by receiving the images of FIGS. 3 to 8 as input. The range to which the present invention is applied in an object may correspond to a face, as shown in FIGS. 3 to 6, or may correspond to an upper body, as shown in FIGS. 7 to 8. However, the scope of the present invention is not limited thereto, and the range to which the present invention is applied in the object may be variously set, e.g., the lower body, the entire body, and the like of the object. Also, among the entire body of the object, only a face may be processed and synthesized, or a background may be included therein.

Figure 15:
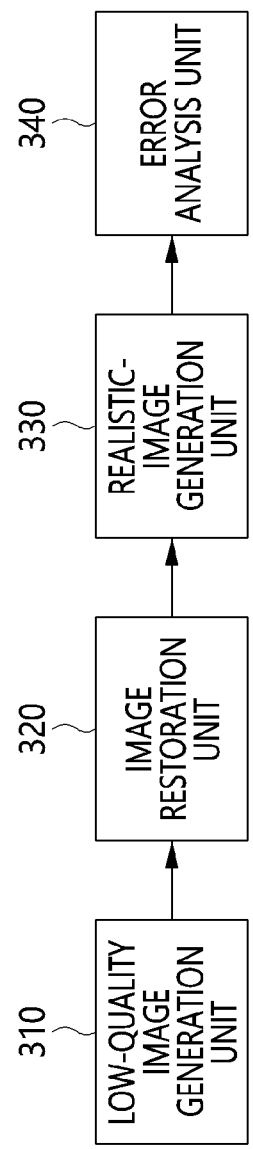
FIG. 15 is a block diagram illustrating an apparatus for improving the quality and realism of a rendered image according to an embodiment of the present invention.

FIG. 15 is a block diagram illustrating an apparatus for improving the quality and realism of a rendered image according to an embodiment of the present invention.

Referring to FIG. 15, the apparatus for improving the quality and realism of a rendered image according to an embodiment of the present invention includes a low-quality image generation unit 310 for generating a low-quality image using training data including a real image and a rendered image, an image restoration unit 320 for generating a high-quality image using the low-quality image, a realistic-image generation unit 330 for generating a realistic image using the high-quality image, and an error analysis unit 340 for training a neural network using an error calculated based on the high-quality image and the realistic image.

Figure 16:
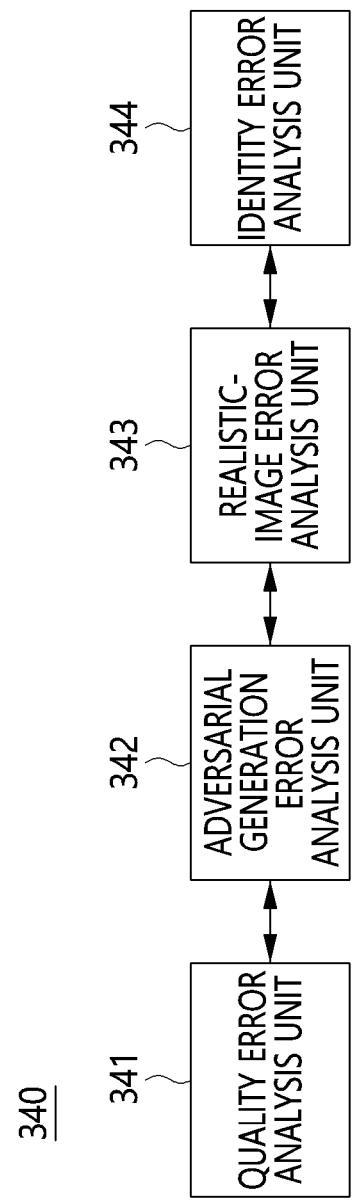
FIG. 16 is a block diagram illustrating in detail an error analysis unit of an apparatus according to an embodiment of the present invention.

FIG. 16 is a block diagram illustrating in detail the error analysis unit of an apparatus according to an embodiment of the present invention.

Referring to FIG. 16, the error analysis unit 340 may include a quality error analysis unit 341 for calculating a quality restoration error between the generated high-quality image and training data transformed to correspond to the high-quality image.

Also, the error analysis unit 340 may include an adversarial generation error analysis unit 342 for calculating an adversarial generation error using a generative adversarial network structure, which uses the neural network for generating a realistic image as the generator thereof.

Here, the generative adversarial network structure may use a real image as a ground truth when the image input thereto is a low-quality image generated based on the real image, and may use an arbitrary real image in the training data as a ground truth when the image input thereto is a low-quality image generated based on a rendered image, because a real image corresponding thereto is not present.

Also, the error analysis unit 340 may include a realistic-image error analysis unit 343 for calculating a pixel restoration error between the training data and the realistic image and calculating a perceptual restoration error based on the respective feature vectors of the training data and the realistic image.

Here, the realistic-image error analysis unit 343 may calculate the pixel restoration error based on a first distance equation when the training data is a real image, and may calculate a pixel restoration error based on a second distance equation, which differs from the first distance equation, when the training data is a rendered image.

Also, the error analysis unit 340 may include an identity error analysis unit 344 for calculating an identity preservation error between the low-quality image and the realistic image using a pretrained identification neural network.

Figure 17:
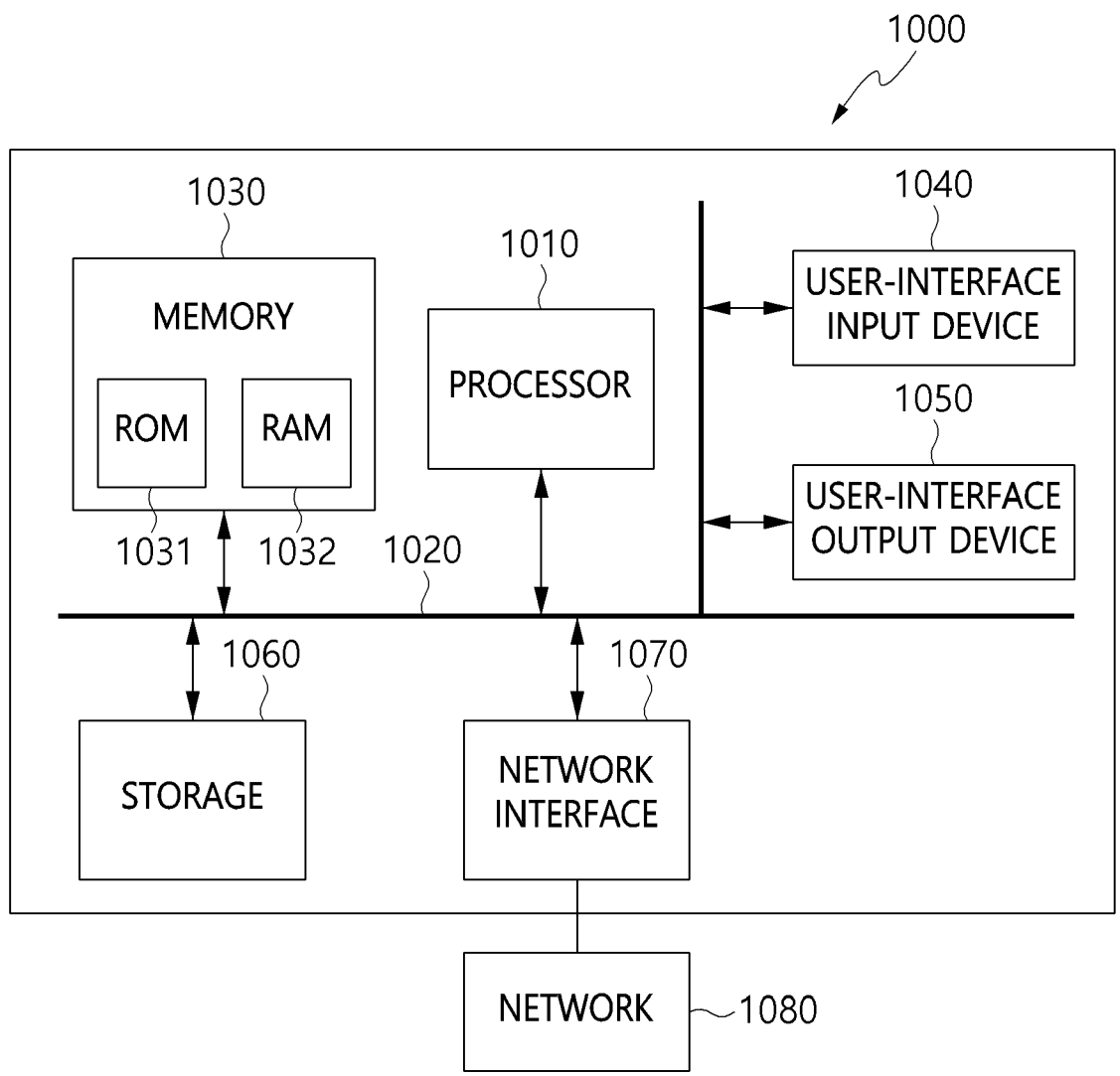
FIG. 17 is a view illustrating the configuration of a computer system according to an embodiment.

FIG. 17 is a view illustrating the configuration of a computer system according to an embodiment.

The apparatus for improving the quality and realism of a rendered image according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

According to the present invention, a neural network for generating a high-quality rendered image may be trained using rendered images having low quality and poor photorealism.

Also, the present invention enables an image providing realism and high quality with small amount of calculation by using a 3D object model created at low cost in a short time.

Specific implementations described in the present invention are embodiments and are not intended to limit the scope of the present invention. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present invention should not be construed as being limited to the above-described embodiments, and the entire scope of the appended claims and their equivalents should be understood as defining the scope and spirit of the present invention.

What is claimed is:

1. A method for improving quality and realism of a rendered image, comprising:
receiving training data, including a real image dataset and a rendered image dataset, wherein the real image dataset includes a real image and the rendered image dataset includes a rendered image generated from 3D graphics rendering;
generating a low-quality image using the training data, wherein the low-quality image is generated by degrading the quality of the image of the training data;
generating a high-quality image using the low-quality image;
generating a realistic image using the high-quality image; and
training a neural network using an error calculated based on the realistic image, wherein the error is defined differently depending on whether the training data is the real image or the rendered image,
wherein the degrading includes performing a color distortion, an addition of Gaussian noise, an image compression and a decrease in resolution on the training data,
wherein the error includes an adversarial generation error, a pixel restoration error and a perceptual restoration error,
wherein the adversarial generation error is calculated based on the real image and the realistic image, the perceptual restoration error is calculated based on the real image, the rendered image and the realistic image, and
wherein the neural network is trained using the adversarial generation error the pixel restoration error and the perceptual restoration error to enhance both image quality and photorealism simultaneously for real-time performance capture applications.

2. The method of claim 1, wherein the error calculated based on the high-quality image and the realistic image includes a quality restoration error between the generated high-quality image and training data transformed to correspond to the high-quality image.

3. The method of claim 1, wherein the adversarial generation error is calculated using a generative adversarial network structure, which uses a neural network for generating the realistic image as a generator.

4. The method of claim 3, wherein the generative adversarial network structure uses a real image as a ground truth when an image input thereto is a low-quality image generated based on the real image, and uses an arbitrary real image in the training data as a ground truth when the image input thereto is a low-quality image generated based on a rendered image, because a real image corresponding thereto is not present.

5. The method of claim 1, wherein the pixel restoration error is calculated by applying a distance equation in pixel units between the real image, the rendered image and the realistic image, and the perceptual restoration error is calculated based on respective feature vectors of the real image, the rendered image and the realistic image.

6. The method of claim 5, wherein the pixel restoration error is calculated based on a first distance equation when the training data is a real image, and is calculated based on a second distance equation, which differs from the first distance equation, when the training data is a rendered image.

7. The method of claim 1, wherein the error calculated based on the high-quality image and the realistic image includes an identity preservation error between the low-quality image and the realistic image, which is calculated using a pretrained identification neural network.

8. An apparatus for improving quality and realism of a rendered image, comprising:
    a processor;
    a low-quality image generator configured to generate, via the processor, a low-quality image using training data, including a real image dataset and a rendered image dataset, wherein the real image dataset includes a real image and the rendered image dataset includes a rendered image generated from 3D graphics rendering;
    an image restorer configured to generate, via the processor, a high-quality image using the low-quality image, wherein the low-quality image is generated by degrading the quality of the image of the training data;
    a realistic-image generator configured to generate, via the processor, a realistic image using the high-quality image; and
    an error analyzer configured to train, via the processor, a neural network using an error calculated based on the realistic image, wherein the error is defined differently depending on whether the training data is the real image or the rendered image,
    wherein the degrading includes performing a color distortion, an addition of Gaussian noise, an image compression and a decrease in resolution on the training data,
    wherein the error includes an adversarial generation error, a pixel restoration error and a perceptual restoration error,
    wherein the adversarial generation error is calculated based on the real image and the realistic image, the perceptual restoration error is calculated based on the real image, the rendered image and the realistic image, and
    wherein the neural network is trained using the adversarial generation error, the pixel restoration error and the perceptual restoration error to enhance both image quality and photorealism simultaneously for real-time performance capture applications.

9. The apparatus of claim 8, wherein the error analyzer includes a quality error analyzer configured to calculate, via the processor, a quality restoration error between the generated high-quality image and training data transformed to correspond to the high-quality image.

10. The apparatus of claim 8, wherein the error analyzer includes an adversarial generation error analyzer configured to calculate, via the processor, the adversarial generation error using a generative adversarial network structure, which uses a neural network for generating the realistic image as a generator.

11. The apparatus of claim 10, wherein the generative adversarial network structure uses a real image as a ground truth when an image input thereto is a low-quality image generated based on the real image, and uses an arbitrary real image in the training data as a ground truth when the image input thereto is a low-quality image generated based on a rendered image, because a real image corresponding thereto is not present.

12. The apparatus of claim 8, wherein the error analyzer includes a realistic-image error analyzer configured to calculate, via the processor, the pixel restoration error by applying a distance equation in pixel units between the real image, the rendered image and the realistic image, and the perceptual restoration error based on respective feature vectors of the real image, the rendered image and the realistic image.

13. The apparatus of claim 12, wherein the realistic-image error analyzer calculates, via the processor, the pixel restoration error based on a first distance equation when the training data is a real image, and calculates, via the processor, the pixel restoration error based on a second distance equation, which differs from the first distance equation, when the training data is a rendered image.

14. The apparatus of claim 8, wherein the error analyzer includes an identity error analyzer configured to calculate, via the processor, an identity preservation error between the low-quality image and the realistic image using a pretrained identification neural network.

* * * * *